Patented Dec. 12, 1922.

1,438,395

UNITED STATES PATENT OFFICE.

JEAN PAISSEAU, OF PARIS, FRANCE.

PROCESS FOR THE MANUFACTURING OF ARTIFICIAL PEARLS AND OTHER NACREOUS OBJECTS.

No Drawing. Application filed April 19, 1920. Serial No. 375,065.

(GRANTED UNDER THE PROVISIONS OF THE ACT OF MARCH 3, 1921, 41 STAT. L., 1313.)

*To all whom it may concern:*

Be it known that I, JEAN PAISSEAU, a citizen of the Republic of France, residing at Paris, 53 Rue de Chateaudun, in the Republic of France, industrial, have invented certain new and useful Improvements in Processes for the Manufacturing of Artificial Pearls and Other Nacreous Objects (for which I have filed applications in France, Sept. 26, 1913, Patent No. 473,533; Germany, Dec. 2, 1913; Great Britain, Nov. 26, 1914, Patent No. 23,137; Spain, Feb. 27, 1919; Switzerland, Feb. 24, 1920; and Japan, April 7, 1920), of which the following is a specification.

This invention relates to an improved process for covering objects with a nacreous coating.

It is known to apply coatings of metallic powder and collodion to paper, glass, or other materials, the metal powder being fixed on the material by means of water which removes the methylic alcohol employed as a solvent for the collodion.

In the present invention, which relates particularly to the manufacture of artificial pearls, a similar chemical method, in itself well known, is employed, that is to say, a substance in solution is precipitated and the solvent absorbed by a suitable reaction.

The methods hitherto employed for coating objects with a nacreous coating, particularly balls of enamel with mother of pearl or any other substance serving for the manufacture of artificial pearls consists in repeatedly dipping the objects into more or less concentrated solutions of agglutinant substances such as gelatine, gelose, cellulose, or its derivatives, resins, caoutchouc, wax and the like, such solutions holding fish scales in suspension, the scales being dehydrated when solutions of cellulosic compositions in non-aqueous liquids are used. Drying of the coated object is effected by the evaporation of the solvents in free air or in a drying apparatus. With thickened solutions the number of coatings can be reduced to a certain extent but to the detriment of the quality and fineness of the coating: with liquid solutions drying rapidly, it is necessary to increase the number of layers and consequently the amount of hand work.

The process which forms the object of the present invention has the advantage of reducing the number of layers necessary to properly coat an object with a nacreous coating, obtains superior quality of the finished article, and provides for a maximum rapidity of drying, and for diminution of the work of production, the operation being carried out under the most practical conditions.

The process consists in precipitating the agglutinating substance such as gelatine or cellulose from any of its solvents, which may be either aqueous, saline or alkaline, or comprise organic solvents such as alcohol, or amyl acetate if the agglutinant used is nitro cellulose or liquid chloride of carbon for example, if the agglutinants consist of cellulose acetates or of cellulose ethers or analogous compositions. The precipitation is effected on the object itself by means of appropriate reagents.

For example, an object, such as a ball of enamel, button, or the like, is covered with a cellulosic solution having a base of amyl acetate and containing dehydrated fish scale. To produce the precipitation of the nitrocellulose and the hardening of the coating without any evaporation the object is immersed in a liquid mixable with the amyl acetate such as alcohol or a liquid carburet, which is a liquid formed by the union of a metalloid or a metal with carbon. A pellicle immediately forms on the surface of the object immersed and this pellicle becomes thicker and thicker whilst the solvent will be diffused slowly in the reagent until complete solidification of the coating.

The same process is employed with cellulosic solutions having a base of acetate of cellulose in a liquid chloride of carbon containing dehydrated fish scale precipitation being effected by alcohol or amyl acetate.

Whatever the solution used the same result is obtained on the object to be coated provided the reagent employed is a precipitating liquid, for example alcohol for a gelatine solution.

Claims:

1. A process for the manufacture of artificial pearls and other nacreous objects, which consists in covering the objects to be treated with a solution of agglutinant substances mixed with fish scale, and in subsequently dipping the objects thus coated in an appropriate reagent which will take up the solvent of the said agglutinant substances, thus obliging these latter to coagulate upon the object.

2. A process for the manufacture of artificial pearls and other nacreous objects, which consists in covering the objects to be treated with a cellulosic solution having a base of amyl acetate and containing dehydrated fish scale, and in subsequently immersing the object thus coated in alcohol until complete solidification of the cellulosic coating.

In testimony, that I claim the foregoing as my invention I have signed my name in presence of a subscribing witness.

PAISSEAU, JEAN.

Witness:
MAURICE RAUX.